E. C. FOWLER & T. E. DALY.
SEED PLANTER.
APPLICATION FILED SEPT. 2, 1908.

942,495.

Patented Dec. 7, 1909.
3 SHEETS—SHEET 1.

Witnesses
M. A. Jones.
Joseph C. Stack.

Inventors
Ernest Cleveland Fowler
Thomas E. Daly
By Julian C. Dowell
their Attorneys

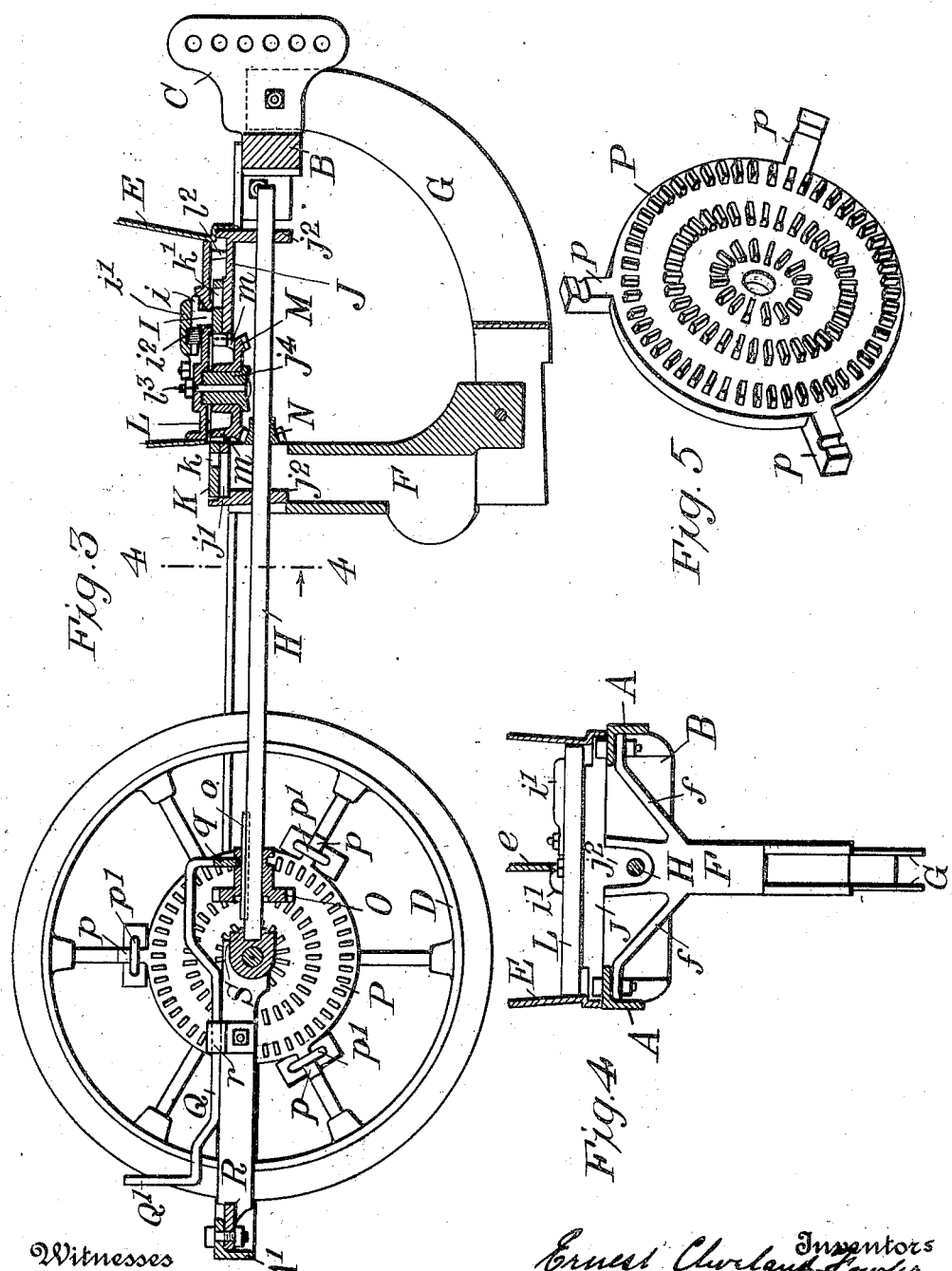

E. C. FOWLER & T. E. DALY.
SEED PLANTER.
APPLICATION FILED SEPT. 2, 1908.

942,495.

Patented Dec. 7, 1909.
3 SHEETS—SHEET 3.

Witnesses
M. A. Jones.
Joseph C. Stack.

Inventors
Ernest Cleveland Fowler
Thomas E. Daly
By Julian C. Dowell
their Attorney.

UNITED STATES PATENT OFFICE.

ERNEST CLEVELAND FOWLER AND THOMAS E. DALY, OF PULASKI, TENNESSEE.

SEED-PLANTER.

942,495.

Specification of Letters Patent.   Patented Dec. 7, 1909.

Application filed September 2, 1908.   Serial No. 451,370.

*To all whom it may concern:*

Be it known that we, ERNEST CLEVELAND FOWLER and THOMAS E. DALY, citizens of the United States, residing at Pulaski, in the county of Giles and State of Tennessee, have invented certain new and useful Improvements in Seed-Planters; and we do hereby declare the following to be a full, clear, and exact description of the invention, such as will enable others skilled in the art to which it appertains to make and use the same.

The principal objects of this invention are to provide, in a seeding machine, improved seed-dropping mechanism for planting two kinds of grain or seed in conjunction, such as corn and pumpkin, corn and peas, cotton-seed and peas, etc.; together with means for covering the seed without packing or undue pressure on the earth above them and to leave an overlying oval-shaped ridge that will shed rain and prevent excessive baking and hardening of the earth above the germinating seed; also to provide improved mechanism for operating the seed-dropping devices and controlling the speed so as to vary the distance between hills as desired.

It is a further object of the invention to provide a seed-planter of simple and practicable construction, efficient operation, and one wherein the mechanism consists of comparatively few parts compactly arranged and adapted to be easily assembled and taken apart.

By reference to the accompanying drawings, which are to be taken as a part of this specification, the invention will hereinafter be first fully described and then more particularly pointed out and defined in the appended claims.

Figure 1:
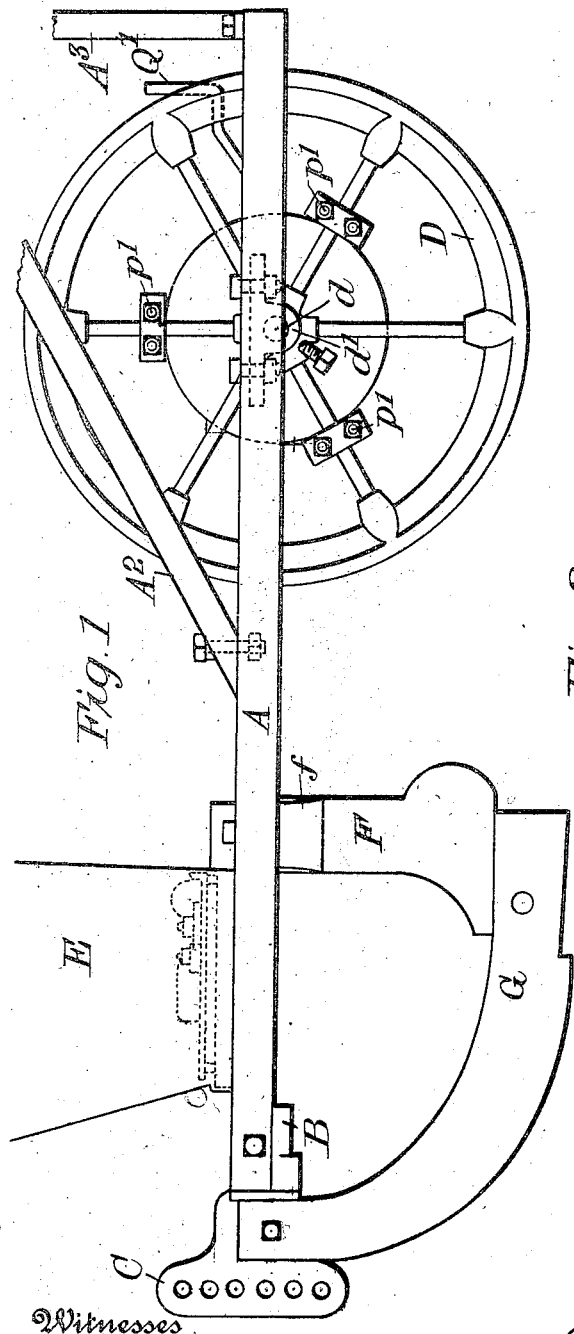
Figure 2:
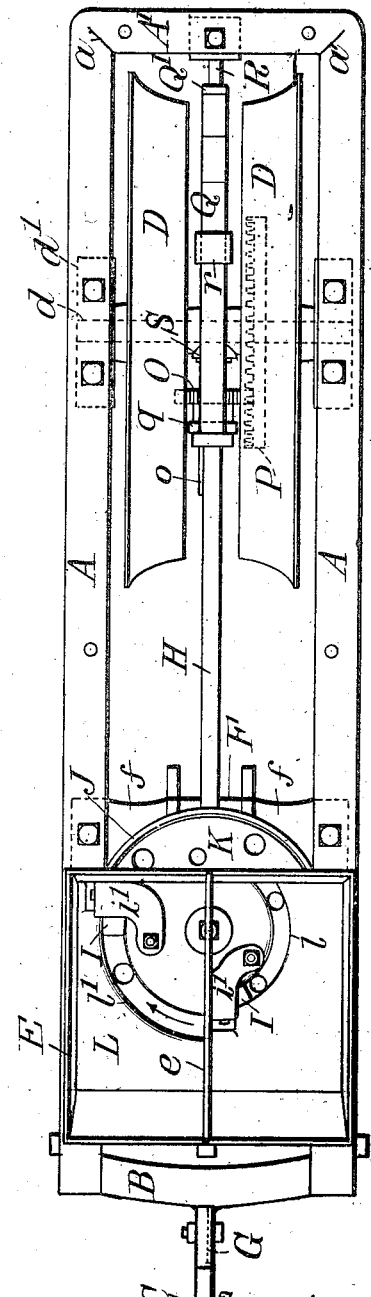
Figure 6:
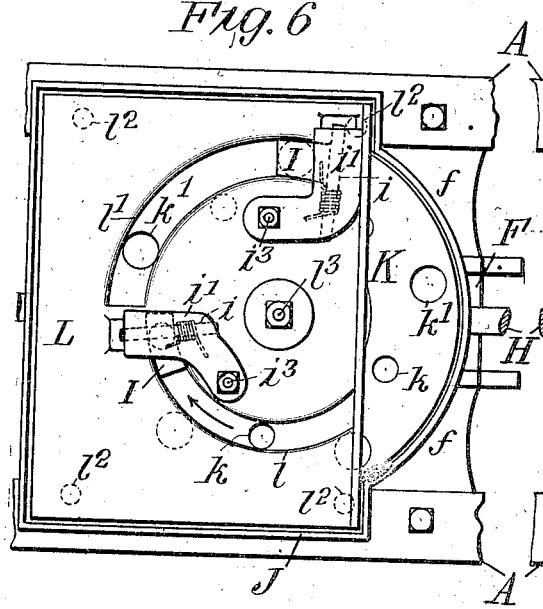
Figure 7:
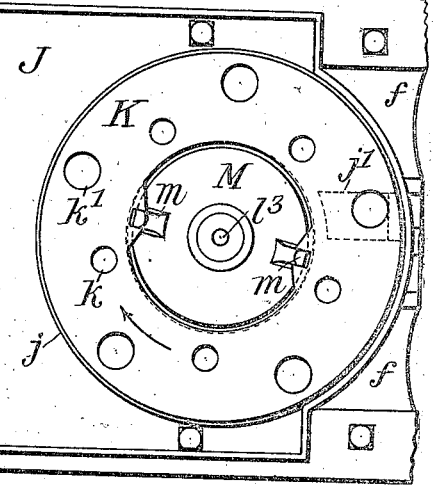
Figure 8:
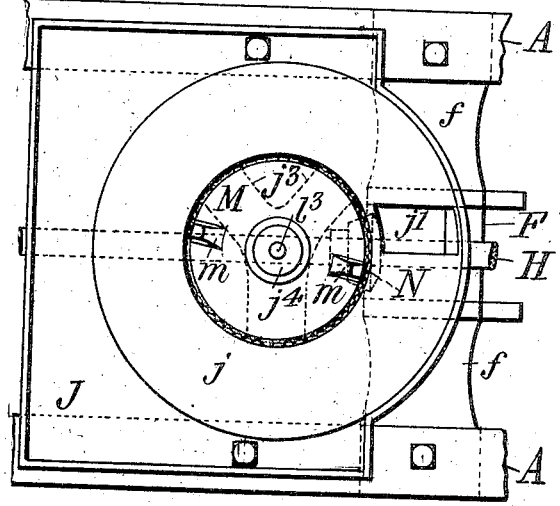
Figure 9:
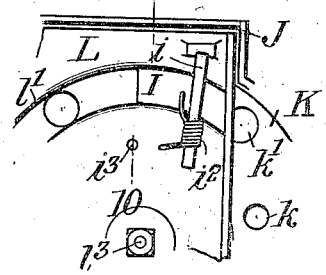
Figure 10:
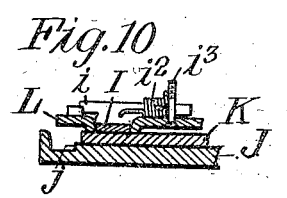

In said drawings, in which the same reference symbols are used to denote corresponding parts in different views: Figure 1 is a side elevation of a seeding machine or planter embodying this invention. Fig. 2 is a plan view of the same. Fig. 3 is a longitudinal sectional view. Fig. 4 is a transverse section on line 4—4 of Fig. 3, looking in the direction of the arrow and showing parts in elevation. In this view the seed-hopper is represented in section. Fig. 5 is a face view in perspective of the multiple speed gear. Fig. 6 is an enlarged plan view of the seeding mechanism, the hopper being omitted. Fig. 7 is a plan view of the same mechanism omitting the cover-plate over the revolving seed-disk. Fig. 8 is a plan view of the base-plate of the seeding mechanism. Fig. 9 is a plan view of a fragment of the seeding mechanism showing a detail of the cover-plate, omitting an angle-shaped bracket which covers the pintle of the cut-off. Fig. 10 is a detail section on line 10—10 of Fig. 9.

The frame of the implement is or may be constructed from a single bar of angle-iron bent into U-shaped form, providing longitudinal side-bars A connected by a rear yoke member $A^1$ (Figs. 2 and 3). In constructing this frame, substantially V-shaped cuts are made in the horizontal flange of the angle-iron to allow bending it, and these inside corner cuts $a$ (Fig. 2) are thus closed up and may if desired be practically eliminated by forging or welding. This integral or jointless structure is quite simple and it makes a strong, rigid and efficient frame, while the flanges of the angle-iron serve for convenient attachment of the parts.

In Fig. 1, $A^2$ denotes inclined handle-bars and $A^3$ upright rearwardly-disposed supports therefor, both of which are mounted upon and attached to the longitudinal frame-bars A.

At the front of the frame, a yoke-shaped cross-piece B is secured to and between the free ends of the longitudinal frame-bars A by means of bolts inserted through the vertical flanges of the angle-iron. Said cross-piece is shown formed or provided with a clevis C having the usual plurality of holes for attachment of the draft appliances.

The frame is supported rearwardly on twin driving and covering-wheels D, operatively geared with the seed-dropping mechanism in the bottom of the box or hopper E; and it is supported forwardly by a curved blade or furrow opener G. The upper end of said blade is shown bolted to and fitted in a recess in the side of the clevis C (Figs. 1, 2 and 3), while the rear lower end of the blade is bifurcated to straddle and is secured to the foot of the chute F through which the grain or seed is conducted or deposited into the furrow made by the blade (Figs. 1, 3 and 4). Lateral arms $f$ on the seed-chute F (Fig. 4) are bolted or secured to the under sides of the horizontal flanges of the frame-bars A, and between said arms the upper end of the chute is made U-shaped to accommodate the longitudinal power-transmission shaft H by which motion is communicated from the drive-wheels D to the seed mechanism, as will be hereinafter described.

The seeding mechanism comprises a base-plate J, a flat perforated annulus or seed-disk K revolubly-mounted thereon, and an overlying cover-plate L, the latter constituting the bottom of the hopper E (Figs. 2, 3, 6, 7 and 8). A partition $e$ divides the hopper E into two compartments (Figs. 2 and 4) for holding different kinds of seed, for instance, corn and pumpkin seed, cotton-seed and peas, or other kinds of seed as desired under different conditions or uses to which the machine may be applied. Said partition $e$ may be removable so that it can be taken out when desired for any purpose. Base-plate J, fastened upon the side frame-bars, has an annular flat seat $j$ (Fig. 8) on which is placed the flat ring or seed-disk K (Figs. 3 and 7). This annular seat $j$ is provided with an oblong opening $j^1$, arranged transversely of the seat or across the path of movement of the seed-disk and directly above the mouth of the seed-chute F. Through this opening the seeds selected and carried around by the disk K, as hereinafter explained, are dropped into the chute. Said base-plate J is also formed or provided with depending lugs $j^2$ $j^2$ constituting bearings for the shaft H (Figs. 3 and 4). The base-plate has also a spider or cross-arm $j^3$ (Fig. 8) spanning the central opening of the plate and formed or provided with an upright tubular boss $j^4$. On this boss is journaled a gear-wheel M by which rotary motion is imparted to the seed-wheel or disk K. Said gear-wheel M is in mesh with and driven by a bevel pinion N on the shaft H.

The seed-disk K, in the form shown, has a double series of holes of different sizes, denominated $k$ and $k^1$ respectively, adapting the smaller holes to receive grains of corn or other small seed and the larger holes to receive pumpkin or other larger seed according to requirements. The disk is of course perforated according to the seed that are desired to be planted in conjunction. The disk encircles the gear-wheel M, and the latter is shown having oppositely-disposed lugs or projections $m$, $m$, engaging similarly-disposed notches in the inner circle or periphery of the seed-disk (Figs. 3, 7 and 8), causing the two parts to interlock and rotate together. It is noted that this mode of connection affords convenient means for assembling and detaching the parts without the necessity of manipulating any fastening devices.

The cover-plate L, which as aforesaid constitutes the hopper bottom, has therein two concentric arc-shaped elongated openings or slots, $l$ and $l^1$, the arc-slot $l$ being arranged within the circle partially described by the arc-slot $l^1$. (Figs. 2, 3 and 6). Each slot is arranged directly over one series of holes in the seed-disk K. The slots are at opposite sides of the partition $e$ in the hopper, so that the seed contained in each compartment can drop into or enter only the holes of the seed-wheel which are exposed below the arc-slot in that compartment. In other words, the smaller seed in one compartment of the hopper may drop through the $l$ slot into the holes $k$ of the disk, while the larger seed in the other compartment may drop through the slot $l^1$ into the holes $k^1$. The cover-plate rests upon the base-plate, being supported thereon by small feet or depending studs $l^2$ (Figs. 3 and 6) so as to leave a slight clearance between the cover-plate and the seed-disk. By means of a bolt $l^3$, inserted through the aforesaid tubular projection or boss $j^4$, the cover-plate and base-plate are secured together, with the seed-disk K arranged between them to revolve with the gear M. As shown, a segment of the seed-disk K and a correspondingly-shaped portion of the base-plate J (in which is formed the opening $j^1$ for discharge of the seed) projects beyond the rear of the cover-plate and hopper sufficiently to permit the holes or cups $k$ and $k^1$ of the seed-disk to pass clear of the hopper bottom and deposit the seed into the chute F.

Within each compartment of the hopper E, the cover-plate L carries a cut-off I (Figs. 2, 3, 6, 9 and 10). This consists of a spring-pressed tongue or finger disposed in the arc-slot of the cover-plate and normally held against or substantially against the face of the seed-disk. Said tongue or finger has a cross-bar or pintle $i$, making the head of a substantially T-shaped device. This cross-bar $i$ is pivotally seated across the arc-slot and beneath one arm of an angle-shaped bracket $i^1$, the said arm being recessed or substantially semi-tubular to house the said cross-bar or pintle $i$ (Fig. 3). On said pintle $i$ is coiled the wire-spring $i^2$ which acts between the bracket $i^1$ and cut-off I and thereby bears the cut-off yieldingly in contact with the face of the seed-disk so as to prevent more than the desired number of grains from entering the holes or cups in said disk. The other arm of said angle-shaped bracket $i^1$ is apertured to receive a bolt $i^3$ by which it is secured to the cover-plate. As shown in Fig. 10, the cut-off is of such breadth and shape as to avoid dropping clear through the slot and into the holes in the disk. As shown, the cut-offs are respectively located at the far ends of the two arc-slots $l$ and $l^1$, considered with reference to the direction of rotation of the disk K which is indicated by an arrow in Figs. 2, 6 and 7. In operation, the seed in the two compartments of the hopper, falling through the slots $l$ and $l^1$ into the holes or cups $k$ and $k^1$ of the seed-disk, will be carried under the cut-offs by rotation of the disks and deposited through the opening $j^1$ into the chute F and dropped into the furrow made by the blade G.

The double supporting and driving wheels D, which serve also for covering the furrow, are provided with concave rims (Fig. 2), the inner edges or margins of said rims being of less diameter than their outer rims or margins, producing a flaring effect with the concavity of each rim confronting the concavity of the adjacent rim, which is slightly separated therefrom. By this means the wheels are adapted to cover the trench without packing or undue pressure on the germinating seed, and to leave the ground in an oval-shaped ridge adapted to shed rain or turn the water to each side of the ridge so as to prevent excessive baking and hardening of the earth above the germinating seed.

The machine can be geared so as to revolve the seed-disk either faster or slower, as may be desired, thereby placing the seed in the ground nearer or farther apart. This is accomplished by a multiple speed gear in combination with a shifting device for changing the speed. The said multiple speed gear consists of a gear-plate P having on its face a plurality of cogs (Figs. 3 and 5); the gear-plate being attached to one of the drive-wheels. On the transmission-shaft H is a sliding pinion O, secured by a spline-and-groove connection $o$ (Figs. 2 and 3), and said pinion is adapted to engage any one of the series of concentric cogs on the gear-plate P. For shifting the pinion, its grooved hub or collar is engaged by the forked end $q$ of a shift-bar Q. Said shift-bar has a handle $Q^1$ for manipulating it, and it may be held stationary by frictional contact with the support R on which it is slidably secured by a yoke or stirrup $r$.

It is noted that the gear-plate P is formed or provided with peripheral projections or lugs $p$ and is secured to the spokes of the drive-wheel by means of U-shaped clips $p^1$ or fastening devices of any appropriate construction, whereby the gear-plate can be easily attached and removed if broken.

As aforesaid the shaft H has bearings in the lugs $j^2$ on the under-side of the base-plate below the hopper, and communicates motion to the seed-disk through the gears N and M. The rear end of said shaft is stepped in a bearing S fitted upon the axle $d$ of the covering-wheels D. The bearings $d^1$ of the axle are preferably bolted or attached to the under-sides of the horizontal flanges of the longitudinal frame-bars. The said bearing S has a rearwardly projecting arm constituting the aforesaid support R on which the shift-bar Q is slidably secured. This arm R is bolted to the rear end of the machine frame to prevent rotation of the bearing S.

It is to be understood that the invention is not restricted to the specific details of construction shown, inasmuch as such changes as may fall within the province of the skilled mechanic may be made without departing from the scope of the invention as pointed out and defined in the appended claims.

The seeder may of course be embodied in a double planter, that is one equipped with two seeding mechanisms for dropping two rows at once. It may also be used for planting either one or two kinds of seeds. It is not necessary to have two varieties in the box unless two varieties are to be planted.

We claim as our invention and desire to secure by Letters Patent:

1. In a seeding machine for planting different kinds of seed in conjunction, a seeding mechanism comprising a hopper divided into separate compartments for the different seed, a base-plate thereunder having a discharge-opening, a revoluble seed-disk thereon having a plurality of concentric rows of holes, both rows of holes adapted to pass over said discharge opening, and a cover-plate in the bottom of the hopper overlying said seed-disk and having within each compartment a segmental slot overlying only one of the said rows of holes in the seed-disk, whereby the different kinds of seed in the compartments are dropped into the different rows of holes and deposited through said discharge-opening.

2. In a seed-planting machine, a seeding mechanism comprising a base-plate having an oblong discharge-opening therethrough extending across the path of movement of a seed-disk, the said seed-disk revolubly seated on said base-plate and having a plurality of concentric rows of holes therethrough, a cover-plate overlying said seed-disk and having a plurality of elongated slots therethrough, one on each side of the center of the seed-disk, and one slot curved in the arc of a circle lying within the circle partially described by the other slot, each of said rows of holes being arranged concentric with or to pass under one of said curved slots, in combination with a divided hopper having a separate compartment arranged over each of said curved slots, and means for rotating said seed-wheel so as to bring the holes therein successively over said discharge-opening.

3. In a seed-planting machine, a seeding mechanism comprising a base-plate having a flat annular portion through a segment of which is formed an oblong discharge-opening extending across the path of movement of a seed-disk, the said seed-disk revolubly seated on said annular portion and having a plurality of concentric rows of holes therethrough, a cover-plate overlying said seed-disk and having a plurality of slots therethrough at opposite sides of the center of the disk, one slot lying within the circle partially described by the other, and each slot concentric with a row of holes in said seed-disk, cut-offs at the terminals of the slots toward which the seed-disk travels, a divided hopper having separate compartments over the respective slots, and means for rotating said seed-wheel so as to bring the holes therein successively over said discharge-opening.

4. In a seed-planter, a revoluble seed-disk having holes or cups therein, and a cover-plate or hopper-bottom thereover having an arc-shaped slot therein overlying said holes or cups, in combination with a cut-off consisting of a substantially T-shaped device having a pintle or cross-bar pivotally-seated across the slot and a tongue or finger projecting therefrom and spring-pressed into said slot and against the face of the disk, and a bracket attached on the cover-plate having a semi-tubular portion housing said pintle or cross-bar.

5. In a seed-planting machine, the combination of a revoluble seed-disk having a plurality of concentric rows of holes, a cover-plate therefor, a two-compartment hopper disposed above the cover-plate, the cover-plate having an arc-shaped slot in each compartment registering with one series of holes in the seed-disk, each of said arc-shaped slots terminating at one end at the rear of the hopper, and means for rotating the seed-disk.

6. In a seed-planting machine, the combination of a base-plate having oppositely-disposed depending lugs, a seed-disk revolubly mounted thereon and having a central gear, a drive-shaft extending longitudinally of the machine and having bearings in said lugs and provided with a gear in mesh with said central gear of said seed-disk, and a drive-wheel axle provided with a step-bearing for the rear end of said shaft.

7. In a seed planting machine, the base-plate of a seeding mechanism having depending apertured lugs and a flat annular seat for a seed-disk adapted to revolve about the central opening in said annulus, together with a cross-bar or spider spanning said central opening and having a boss thereon, in combination with a gear-wheel journaled on said boss, the said seed-disk locked to said gear-wheel, a shaft extending longitudinally of the machine and having its bearings in said lugs and in a bearing-block fitted on the axle of rear supporting wheels, one of said wheels carrying concentric rows of cogs or teeth, said shaft having a gear fixed thereon in mesh with the gear on said boss, and having an adjustable gear-wheel adapted to engage any one of said concentric rows of cogs, and means for throwing said adjustable gear-wheel into and out of engagement with said cogs.

In testimony whereof we affix our signatures, in presence of two witnesses.

ERNEST CLEVELAND FOWLER
THOS. E. DALY.

Witnesses:
S. C. APPLEBY,
H. C. WILSON.